US011520420B2

United States Patent
Cheng

(10) Patent No.: US 11,520,420 B2
(45) Date of Patent: Dec. 6, 2022

(54) METHOD AND SYSTEM FOR DETECTING WIDTH OF TOUCH PATTERN AND IDENTIFYING TOUCH PATTERN

(71) Applicant: GUANGZHOU SHIRUI ELECTRONICS CO. LTD., Guangzhou (CN)

(72) Inventor: Yao Cheng, Guangzhou (CN)

(73) Assignee: GUANGZHOU SHIRUI ELECTRONICS CO. LTD., Guangzhou (CN)

( * ) Notice: Subject to any disclaimer, the term of this patent is extended or adjusted under 35 U.S.C. 154(b) by 0 days.

(21) Appl. No.: 16/074,644

(22) PCT Filed: Dec. 29, 2016

(86) PCT No.: PCT/CN2016/113200
§ 371 (c)(1),
(2) Date: Aug. 1, 2018

(87) PCT Pub. No.: WO2017/133363
PCT Pub. Date: Aug. 10, 2017

(65) Prior Publication Data
US 2019/0056814 A1  Feb. 21, 2019

(30) Foreign Application Priority Data

Feb. 2, 2016 (CN) .......................... 201610074095.0

(51) Int. Cl.
*G06F 3/041* (2006.01)
*G06F 16/00* (2019.01)
(Continued)

(52) U.S. Cl.
CPC .......... *G06F 3/041* (2013.01); *G06F 3/04883* (2013.01); *G06F 16/00* (2019.01); *G06F 16/245* (2019.01)

(58) Field of Classification Search
CPC ........ G06F 3/041; G06F 16/245; G06F 16/00; G06F 3/04883; G06F 3/04847; G06F 3/0488
See application file for complete search history.

(56) References Cited

U.S. PATENT DOCUMENTS 6,128,661 A * 10/2000 Flanagin .................. G06F 8/61
  709/217
6,323,846 B1 * 11/2001 Westerman ........... G06F 3/0235
  345/173

(Continued)

FOREIGN PATENT DOCUMENTS

| CN | 103049131 A | 4/2013 |
| CN | 104123094 A | 10/2014 |

(Continued)

OTHER PUBLICATIONS

PCT Search Report received in PCT/CN2016/113200 dated Apr. 12, 2017, pp. 2.

(Continued)

*Primary Examiner* — Patrick N Edouard
*Assistant Examiner* — Joseph P Fox
(74) *Attorney, Agent, or Firm* — Zhong Law, LLC

(57) ABSTRACT

Disclosed are a method and a system for detecting a touch pattern width and identifying the touch pattern, including receiving, from a touch device, first coordinate information and corresponding touch width information for a touch pattern, and storing the first coordinate information and the touch width information, receiving, from an operating system, second coordinate information for a current touch pattern, and searching, from the stored first coordinate information, for one consistent with the second coordinate information, and determining the touch width information (Continued)

corresponding to the first coordinate information that has been found as width information of the current touch pattern.

15 Claims, 3 Drawing Sheets

(51) Int. Cl.
  *G06F 3/04883* (2022.01)
  *G06F 16/245* (2019.01)

(56) References Cited

U.S. PATENT DOCUMENTS

| | | | |
|---|---|---|---|
| 2005/0052427 A1* | 3/2005 | Wu | G06F 40/166 345/173 |
| 2008/0012838 A1* | 1/2008 | Rimon | G06F 3/044 345/174 |
| 2011/0084938 A1 | 4/2011 | Wang | |
| 2011/0282785 A1 | 11/2011 | Chin | |
| 2013/0014248 A1* | 1/2013 | McLaughlin | G06F 3/04883 726/17 |
| 2013/0326583 A1* | 12/2013 | Freihold | G06F 3/04815 726/3 |
| 2013/0339346 A1* | 12/2013 | Cho | G06F 16/5846 707/722 |
| 2014/0002395 A1* | 1/2014 | Ito | G06F 3/01 345/173 |
| 2014/0002407 A1* | 1/2014 | Badaye | G06F 3/0416 345/174 |
| 2015/0381649 A1* | 12/2015 | Schultz | H04L 63/1433 726/25 |
| 2016/0085407 A1* | 3/2016 | Liu | G06F 21/316 345/173 |

FOREIGN PATENT DOCUMENTS

| | | |
|---|---|---|
| CN | 105739871 A | 7/2016 |
| EP | 2626778 A2 | 8/2013 |
| WO | 2014187353 A1 | 11/2014 |

OTHER PUBLICATIONS

Supplementary European Search Report received in EP16889169 dated Dec. 13, 2018, pp. 1.

* cited by examiner

METHOD AND SYSTEM FOR DETECTING WIDTH OF TOUCH PATTERN AND IDENTIFYING TOUCH PATTERN

CROSS-REFERENCE TO RELATED APPLICATIONS

This application claims priority to International Patent Application No. PCT/CN2016/113200 filed Dec. 29, 2016, which claims priority to Chinese application No. CN 201610074095.0, filed Feb. 2, 2016, which are hereby incorporated by reference as though fully set forth herein.

TECHNICAL FIELD

The present disclosure relates to touch information processing technologies and, in particular, to a method and a system for detecting a touch pattern width and identifying a touch pattern.

BACKGROUND

In recent years, touch devices have been widely used in people's work and life. This wide usage places a higher requirement on processing of related touch information on the touch devices.

Generally, in order to transmit information such as the width or the area of the touch point to application software at a PC side, a touch input device such as a touch frame of a touch device would transmit the touch width information and the touch coordinate information collectively to a corresponding operating system for distribution to the application software. However, due to technology complexity for transmitting the width information to the operating system, some manufacturers' touch input devices only can report the coordinate information to the operating system without reporting the width information to the said operating system concurrently, thereby impacting the effectiveness for the application software to obtain the touch information.

SUMMARY

Based on this, it is desirable to provide a method and a system for detecting a touch pattern width and identifying a touch pattern to solve the technical problem that the traditional technology impact the effectiveness for application software to obtain touch information.

A method for detecting a touch pattern width, including steps of:
  receiving, from a touch device, first coordinate information and corresponding touch width information for a touch pattern, and storing the first coordinate information and the touch width information;
  receiving, from an operating system, second coordinate information for a current touch pattern, wherein the second coordinate information is touch pattern coordinate information sent by the touch device to the operating system; and
  searching, from the stored first coordinate information, for one consistent with the second coordinate information, and determining the touch width information corresponding to the first coordinate information that has been found as width information of the current touch pattern.

In the method for detecting the touch pattern width described above, the application software that needs to acquire the touch information of the touch pattern can directly obtain the first coordinate information and the touch width information corresponding thereto sent by the touch device through related software, and also can obtain the second coordinate information of the current touch pattern through the corresponding operating system to search for corresponding first coordinate information according to the second coordinate information sent by the operating system, thereby detecting the touch pattern width information. This allows application program more easily to obtain the first coordinate information through the operating system and to respond to an application level action, simplifies the detection process of the corresponding touch width information, and ensures the effectiveness of acquisition of the touch information corresponding to the touch pattern.

In an embodiment, the process of receiving, from the touch device, the first coordinate information and the corresponding touch width information for a touch pattern may include:
  acquiring first coordinate information of the touch pattern and corresponding touch width information from the touch device through a relay service program installed on the operating system.

The method for detecting the touch pattern width described above may use the relay service program installed on the operating system to obtain the first coordinate information of the touch pattern and the corresponding touch width information, and realize the decoupling between the touch device and the application program.

In an embodiment, the process of storing the first coordinate information and the touch width information includes:
  establishing a touch information set according to the first coordinate information and the touch width information;
  establishing a touch information table; and
  storing the touch information set into the touch information table.

According to the method for detecting the touch pattern width described above, the efficiency of subsequent searching for the first coordinate information and further detecting the corresponding touch width information may be improved by establishing the touch information table and using the touch information table to store the touch information set corresponding to the first coordinate information and the touch width information.

As an embodiment, the process of searching, from the stored first coordinate information, for one consistent with the second coordinate information and determining the first coordinate information that has been found as width information of the current touch pattern includes:
  comparing the second coordinate information with each piece of first coordinate information in the touch information table, and acquiring the first coordinate information consistent with the second coordinate information;
  reading touch width information in the touch information set corresponding to the first coordinate information; and determining width information of the current touch pattern according to the touch width information.

In an embodiment, the process of storing the first coordinate information and the touch width information includes:
  establishing a data dictionary, and storing the first coordinate information and the touch width information into the data dictionary;

the process of searching for first coordinate information consistent with the second coordinate information includes:

searching, from the data dictionary, for the first coordinate information having a distance from the second coordinate information smaller than a preset threshold and obtaining first coordinate information consistent with the second coordinate information.

Since the first coordinate information and the second coordinate information may have related errors during the acquisition process, the first coordinate information and the second coordinate information may include allowable deviations from the coordinate information corresponding to the touch pattern, and thus assigning the first coordinate information having a distance from the second coordinate information smaller than the preset threshold as the first coordinate information consistent with the second coordinate information improves the efficiency of searching for the first coordinate information. The preset threshold may be set according to factors such as the size and resolution of the touch device, for instance, set to values of 1, 0.5 or the like.

In an embodiment, the method for detecting the touch pattern width further includes:

deleting the touch width information that has been found and the corresponding first coordinate information, and releasing storage space occupied by the touch width information and the first coordinate information.

In the method for detecting the touch pattern width described above, after the touch width information required by the application program is detected, the touch width information and the corresponding first coordinate information are deleted, and the storage space occupied by the touch width information and the first coordinate information may be released, so as to increase the efficiency of the corresponding application program.

In an embodiment, before a process receiving first coordinate information and touch width information corresponding thereto sent by a touch device for a touch pattern, the method further includes:

using a serial port to set a first communication link with the touch device and a second communication link with the operating system respectively, wherein the first communication link is to receive the first coordinate information and the touch width information corresponding thereto sent by the touch device, and the second communication link is to receive the second coordinate information sent by the operating system.

According to the method for detecting the touch pattern width described above, using the serial port to transmit corresponding information ensures the stability of the transmitted information.

In an embodiment, the touch width information includes long axis information and short axis information of an inscribed ellipse corresponding to the touch pattern.

A method for identifying a touch pattern includes steps of:
receiving, from a touch device, first coordinate information and corresponding touch width information for the touch pattern, and storing the first coordinate information and the touch width information;
receiving, from an operating system, second coordinate information for a current touch pattern, wherein the second coordinate information is touch pattern coordinate information sent by the touch device to the operating system;
searching, from the stored first coordinate information, for one consistent with the second coordinate information, and determining the touch width information corresponding to the first coordinate information that has been found as width information of the current touch pattern; and
identifying the touch pattern according to the touch width information.

In the method for identifying the touch pattern described above, the application software that needs to acquire the touch information of the touch pattern can directly obtain the first coordinate information and the touch width information corresponding thereto sent by the touch device through related software, and can also obtain the second coordinate information of the current touch pattern through the corresponding operating system to then search for corresponding first coordinate information, thereby detecting touch pattern width information, and then identifying the corresponding touch pattern according to the detected width information. This allows the application program more easily respond to application level action, simplifies the detection process of the corresponding touch width information, and ensures the effectiveness of acquisition of the touch information corresponding to the touch pattern, thereby improving the effectiveness of identification of the touch pattern.

A system for detecting a touch pattern width includes:
a first receiving module, to receive, from a touch device, first coordinate information and corresponding touch width information for a touch pattern, and store the first coordinate information and the touch width information;
a second receiving module, to receive, from an operating system, second coordinate information for a current touch pattern, wherein the second coordinate information is touch pattern coordinate information sent by the touch device to the operating system; and
a detecting module, to search, from the stored first coordinate information, for one consistent with the second coordinate information, and determine the touch width information corresponding to the first coordinate information that has been found as width information of the current touch pattern.

In the system for detecting the touch pattern width described above, the application software that needs to acquire the touch information of the touch pattern can directly obtain the first coordinate information and the touch width information corresponding thereto sent by the touch device through related software, and can obtain the second coordinate information of the current touch pattern through the corresponding operating system to search for corresponding first coordinate information according to the second coordinate information sent by the operating system, thereby detecting the touch pattern width information. This allows the application program more easily to obtain the first coordinate information through the operating system and to respond to an application level action, simplifies the detection process of the corresponding touch width information, and ensures the effectiveness of acquisition of the touch information corresponding to the touch pattern.

A system for identifying a touch pattern includes:
a first receiving module, to receive, from a touch device, first coordinate information and corresponding touch width information for the touch pattern, and store the first coordinate information and the touch width information;
a second receiving module, to receive, from an operating system, second coordinate information for a current touch pattern, wherein the second coordinate information is touch pattern coordinate information sent by the touch device to the operating system;

a detecting module, to search, from the stored first coordinate information, for one consistent with the second coordinate information, and determine the touch width information corresponding to the first coordinate information that has been found as width information of the current touch pattern; and an identifying module, to identify the touch pattern according to the touch width information.

In the system for identifying the touch pattern described above, the application software that needs to acquire the touch information of the touch pattern can directly obtain the first coordinate information and the touch width information corresponding thereto sent by the touch device through related software, and can also obtain the second coordinate information of the current touch pattern through the corresponding operating system to then search for corresponding first coordinate information, thereby detecting touch pattern width information, and then identifying the corresponding touch pattern according to the detected width information. This allows application program more easily to respond to an application level action, simplifies the detection process of the corresponding touch width information, and ensures the effectiveness of acquisition of the touch information corresponding to the touch pattern, thereby improving the effectiveness of identification of the touch pattern.

DETAILED DESCRIPTION OF EMBODIMENTS

Specific embodiments of a method and a system for detecting a touch pattern width according to the present disclosure will be described in detail below with reference to the accompanying drawings.

Figure 1:
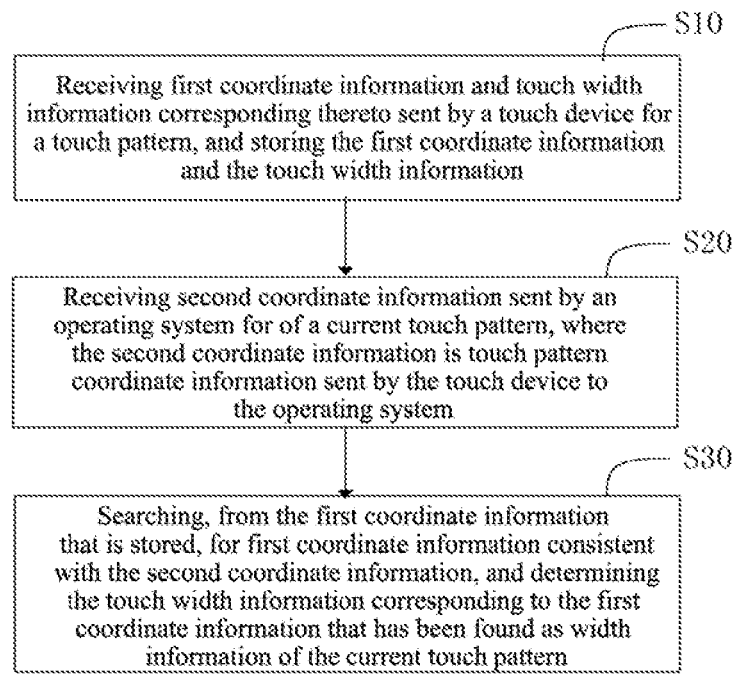
FIG. 1 is a flowchart of a method for detecting a touch pattern width according to an embodiment.

References may be made to FIG. 1 which is a flow chart of a method for detecting a touch pattern width according to an embodiment, including steps of:

S10: receiving, from a touch device, first coordinate information and corresponding touch width information for a touch pattern, and storing the first coordinate information and the touch width information In Step S10 described above, the touch device may perform related reading for a touch pattern input by a user through a relevant touch operation to obtain first coordinate information and touch width information of the touch pattern, and send the first coordinate information and the touch width information directly to an application program.

Figure 2:
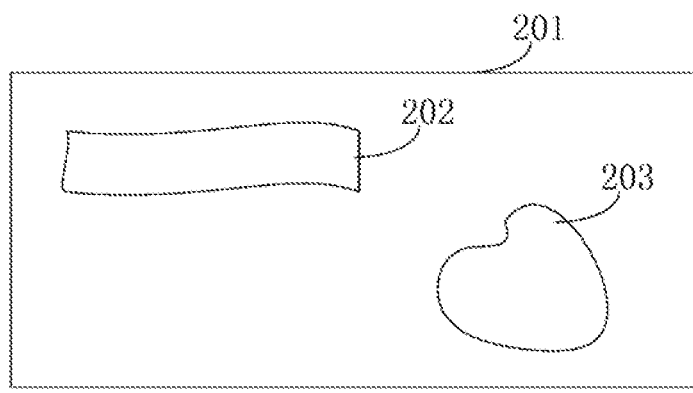
FIG. 2 is a schematic diagram of a touch pattern according to an embodiment.

References may be made to FIG. 2. The touch pattern described above may be a pattern 202 on a touch device 201 as shown in FIG. 2, or may be a pattern 203 on the touch device 201, where the described touch pattern 202 may be a pattern that a user's finger slides on a corresponding touch screen, and the described pattern 203 may be a pattern that a user inputs to the touch device 201 through his palm.

The described first coordinate information may include a central coordinate value of a closed geometric shape corresponding to the touch pattern, and the touch width information corresponding to the first coordinate information includes information such as length and width of a circumscribed rectangle of the closed geometric shape corresponding to the same touch pattern, or includes long axis information, short axis information, and the like of an inscribed ellipse of the closed geometric shape corresponding to the touch pattern described above.

During storage of the first coordinate information and the touch width information, the first coordinate information and the touch width information corresponding thereto need to be stored correspondingly, where a piece of first coordinate information uniquely corresponds to a piece of touch width information, and a corresponding piece of touch width information may be accurately detected in the storage space according to a certain piece of first coordinate information. A corresponding table may be created to store the first coordinate information and the touch width information to improve the convenience of subsequent searching and detecting.

S20: receiving, from an operating system, second coordinate information sent for a current touch pattern, where the second coordinate information is touch pattern coordinate information sent by the touch device to the operating system The second coordinate information may include a central coordinate value of a closed geometric shape corresponding to the touch pattern, and the first coordinate information and the second coordinate information of the same touch pattern are consistent. After acquiring the coordinate information of the current touch pattern, the touch device sends the coordinate information to the operating system, and the operating system in turn sends the coordinate information to the application program, that is, the second coordinate information received by the application program. The said operating system may include a Windows system, a Linux system, an OSX system, or the like.

Figure 3:
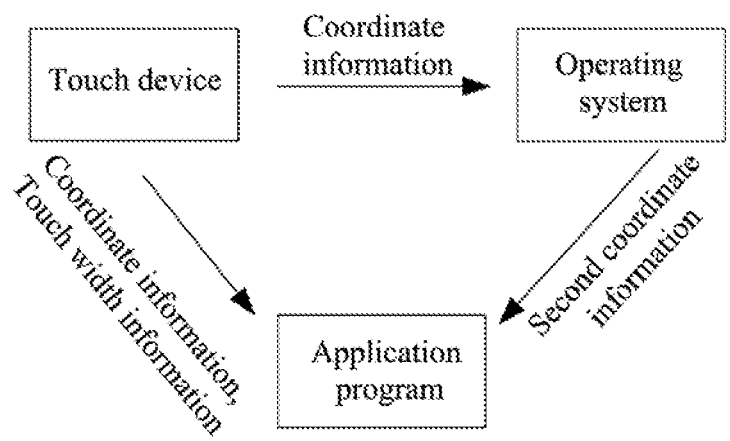
FIG. 3 is a schematic diagram of transmission of coordinate information and touch width information according to an embodiment.

S30: searching, from the stored first coordinate information, for one consistent with the second coordinate information, and determining touch width information corresponding to the first coordinate information that has been found as width information of the current touch pattern As an embodiment, FIG. 3 shows transmission of the coordinate information and the touch width information of the same touch pattern. After acquiring coordinate information and touch width information of the touch pattern, the touch device sends the coordinate information and the touch width information to the application program, correspondingly, the application program receives the coordinate information and the touch width information and obtains first coordinate information and touch width information corresponding thereto; the touch device further sends the coordinate information of the touch pattern to the operating system, and the operating system then sends the received coordinate information (second coordinate information) to the application program, so that the application program can directly process the coordinate information forwarded by the operating system supported by the application programming framework.

In this way, the application can more easily respond to application level action when receiving the coordinate information forwarded by the operating system, compared to direct processing of the related data sent by the touch device to the application program. The operating system only forwards the coordinate information of the touch pattern without forwarding the corresponding touch width information, so that the amount of data forwarded by the operating system can be as small as possible to improve the corresponding forwarding effectiveness. After receiving the second coordinate system forwarded by the operating system, the application program can both simply make an application level response and obtain complete touch information according to the second coordinate information (including the first coordinate information and the touch width information corresponding to the second coordinate information) through processing such as searching and detecting in the storage space.

In the method for detecting the touch pattern width provided in the present disclosure, the application software that needs to acquire the touch information of the touch pattern can directly obtain the first coordinate information and the touch width information corresponding thereto sent by the touch device through related software, and can also acquire the second coordinate information of the current touch pattern through the corresponding operating system by searching for corresponding first coordinate information according to the second coordinate information sent by the operating system, thereby detecting the touch pattern width information. This allows the application program more easily to acquire the first coordinate information through the operating system and to respond to application-level action, simplifies the detection process of the corresponding touch width information, and ensures the effectiveness of acquisition of the touch information corresponding to the touch pattern.

In an embodiment, the process of receiving first coordinate information and touch width information corresponding thereto sent by a touch device for a touch pattern may include:

Acquiring, from the touch device through relay service program installed on the operating system, first coordinate information of the touch pattern and corresponding touch width information.

In this embodiment, the operating system sets the relay service program for transmitting and receiving the first coordinate information and the touch width information corresponding thereto; the touch device first sends the first coordinate information and the touch width information corresponding thereto to the relay service program, and then the relay service program forwards the same to the corresponding application program to realize, using the corresponding relay performed by the said relay service program, the decoupling between the touch device and the application program.

In an embodiment, the process of storing the first coordinate information and the touch width information described above may include:

establishing a touch information set according to the first coordinate information and the touch width information;

establishing a touch information table; and storing the touch information set into the touch information table.

The touch information set includes a set of corresponding first coordinate information and touch width information, when a certain touch information set is found in the storage space of the application program, the first coordinate information and the touch width information therein may be acquired, and the efficiency of detecting the touch width information according to the first coordinate information may be improved. By establishing the touch information table, each touch information set including the first coordinate information and the touch width information may be stored into the touch information table in an orderly manner, so that the touch information set is easier to be identified.

As an embodiment, the process of searching, from the stored first coordinate information, for one consistent with the second coordinate information and determining the touch width information corresponding to the first coordinate information that has been found as width information of the current touch pattern may include:

comparing the second coordinate information with each piece of first coordinate information in the touch information table, and acquiring the first coordinate information consistent with the second coordinate information;

reading touch width information in the touch information set corresponding to the first coordinate information; and determining width information of the current touch pattern according to the touch width information.

The second coordinate information and the first coordinate information may respectively include an identifier, and during the comparison, the second coordinate information and the first coordinate information that have the same identifier are second coordinate information and first coordinate information that are consistent; the identifier may include content that can uniquely represent the coordinate information of the touch pattern, such as an acquisition time and an acquisition position of the first coordinate information and the second coordinate information.

In an embodiment, the process of storing the first coordinate information and the touch width information described above may include:

establishing a data dictionary, and storing the first coordinate information and the touch width information into the data dictionary;

The process of searching for the first coordinate information consistent with the second coordinate information includes:

searching, from the data dictionary, for the first coordinate information having a distance from the second coordinate information smaller than a preset threshold, and obtaining first coordinate information consistent with the second coordinate information.

In this embodiment, the establishment of the data dictionary to store the first coordinate information and the touch width information facilitates the subsequent search for the first coordinate information. Since the first coordinate information and the second coordinate information may have related errors during the acquisition process, the first coordinate information and the second coordinate information may include allowable deviations from the coordinate information corresponding to the touch pattern, and thus assigning the first coordinate information having a distance from the second coordinate information smaller than the preset threshold as the first coordinate information consistent with the second coordinate information improves the efficiency of searching for the first coordinate information. The preset threshold may be set according to factors such as the size and resolution of the touch device, for instance, set to values of 1, 0.5, or the like.

In one embodiment, the method for detecting the touch pattern width further includes:

deleting the touch width information that has been found and the corresponding first coordinate information, and releasing storage space occupied by the touch width information and the first coordinate information.

In this embodiment, after the touch width information required by the application program is deleted, the touch width information and the corresponding first coordinate information are deleted, and the storage space occupied by the touch width information and the first coordinate information may be released, so as to increase the efficiency of the corresponding application program.

In one embodiment, before the process of receiving first coordinate information and the touch width information corresponding thereto sent by a touch device for a touch pattern, the method further includes:

using a serial port to set a first communication link with the touch device and a second communication link with the operating system respectively, where the first communication link is to receive the first coordinate information and the touch width information corresponding thereto sent by the touch device, and the second communication link is to receive the second coordinate information sent by the operating system.

The touch device can respectively send relevant data to the application program and the operating system by using communication links set via the serial port; after receiving the second coordinate information, the operating system can separately send the second coordinate information to the application program by using the communication link set via the serial port.

If the first coordinate information and the touch width information corresponding thereto are sent to the application program through the relay service program, the touch device may send the first coordinate information and the touch width information corresponding thereto to the relay service program by using the communication link set via the serial port, and the relay service program sends the data to the application program by using the communication link set via the serial port.

In this embodiment, the serial port is to transmit corresponding information. The serial port can ensure the stability of the transmitted information.

In one embodiment, the touch width information may include long axis information and short axis information of an inscribed ellipse corresponding to the touch pattern.

In this embodiment, the touch pattern is modified by using an inscribed ellipse corresponding to the touch pattern, so that the inscribed ellipse for acquiring the touch width information completely falls within the touch area of the user, and covers the corresponding touch pattern as much as possible to ensure the accuracy of the acquired touch width information; the touch width information may be indicated as (w, h); where w represents the long axis length of the inscribed ellipse, and h represents the short axis length of the inscribed ellipse; information such as the areas and size of the touch pattern may be obtained according to the long axis information and the short axis information. The touch pattern may be correspondingly identified according to the information such as the areas and size of the touch pattern. The unit of the long axis information and the short axis information described above may be a pixel.

In one embodiment, the touch width information may include a length and a width of a circumscribed rectangle corresponding to the touch pattern.

In this embodiment, the touch pattern is modified by using a circumscribed rectangle corresponding to the touch pattern, so that the corresponding touch pattern may completely fall within the circumscribed rectangle, and the circumscribed rectangle may include all the information of the touch pattern; the touch width information may be represented by (a, b); where a represents the length of the circumscribed rectangle, and b represents the width of the circumscribed rectangle; according to the length and width of the circumscribed rectangle, information such as the areas and size of the touch pattern may be obtained. The touch pattern may be correspondingly identified according to the information such as areas and size of the touch pattern. The unit of the above length and width may be a pixel.

Figure 4:
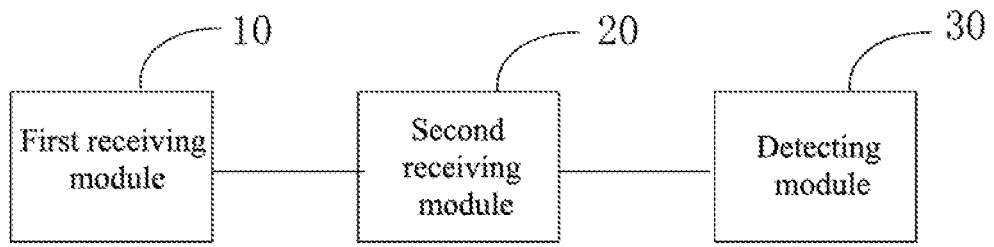
FIG. 4 is a schematic structural diagram of a system for detecting a touch pattern width according to an embodiment.

References may be made to FIG. 4 which is a schematic structural diagram of a system for detecting a touch pattern width according to an embodiment, including:

a first receiving module 10 to receive, from a touch device, first coordinate information and corresponding touch width information for a touch pattern, and store the first coordinate information and the touch width information;

a second receiving module 20 to receive, from an operating system, second coordinate information for a current touch pattern, where the second coordinate information is touch pattern coordinate information sent by the touch device to the operating system; and a detecting module 30 to search, from the stored first coordinate information, for one consistent with the second coordinate information, and determine the touch width information corresponding to the first coordinate information that has been found as width information of the current touch pattern.

The system for detecting the touch pattern width provided in the present disclosure has a one-to-one correspondence with the method for detecting the touch pattern width provided in the present disclosure, as described hereby, the technical features and the beneficial effects described in the embodiment of the method for detecting the touch pattern width are applicable to the embodiment of the system for detecting the touch pattern width.

Figure 5:
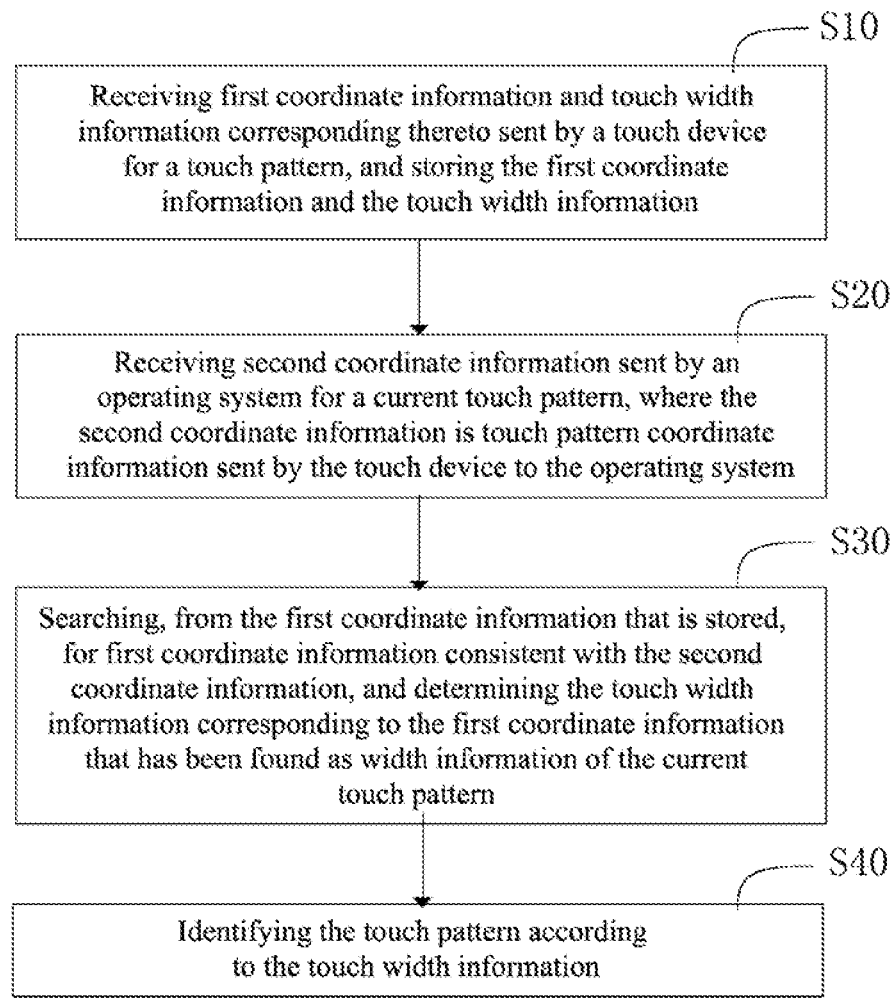
FIG. 5 is a flowchart of a method for identifying a touch pattern according to an embodiment.

References may be made to FIG. 5 which is a flowchart of a method for identifying a touch pattern according to an embodiment, including steps of:

S10: receiving, from a touch device, first coordinate information and corresponding touch width information for the touch pattern, and storing the first coordinate information and the touch width information.

In Step S10 described above, the touch device may perform related reading for a touch pattern input by a user through a touch operation to obtain first coordinate information and touch width information of the touch pattern, and send the first coordinate information and the touch width information directly to an application program.

References may be made to FIG. 2. The touch pattern may be a pattern 202 on a touch device 201 as shown in FIG. 2, or may be a pattern 203 on the touch device 201, where the described touch pattern 202 may be a pattern of a user's finger sliding on a corresponding touch screen, and the described pattern 203 may be a pattern of a user inputting to the touch device 201 using his palm.

The described first coordinate information may include a central coordinate value of a closed geometric shape corresponding to the touch pattern, and the touch width information corresponding to the first coordinate information includes information such as length and width of a circumscribed rectangle of the closed geometric shape corresponding to the same touch pattern, or includes long axis information, short axis information, and the like of an inscribed ellipse of the closed geometric shape corresponding to the touch pattern described above.

During storage of the first coordinate information and the touch width information the first coordinate information and the touch width information corresponding thereto need to be stored correspondingly, where a piece of first coordinate information uniquely corresponds to a piece of touch width information, and a corresponding piece of touch width information may be accurately detected in the storage space according to a certain piece of first coordinate information. A corresponding table may be created to store the first coordinate information and the touch width information to improve the convenience of subsequent searching and detecting.

S20: receiving, from an operating system, second coordinate information sent by an operating system for a current touch pattern; where the second coordinate information is touch pattern coordinate information sent by the touch device to the operating system The second coordinate information may include a central coordinate value of a closed geometric shape corresponding to the touch pattern, and the first coordinate information and the second coordinate information of the same touch pattern are consistent. After acquiring the coordinate information of the current touch pattern, the touch device sends the coordinate information to the operating system, and the operating system in turn sends the coordinate information to the application program, that is, the second coordinate information received by the application program. The said operating system may include a Windows system, a Linux system, an OSX system, or the like.

S30: searching, from the stored first coordinate information, for one consistent with the second coordinate information, and determining touch width information corresponding to the first coordinate information that has been found as width information of the current touch pattern As an embodiment, FIG. 3 shows transmission of the coordinate information and the touch width information of the same touch pattern. After acquiring coordinate information and touch width information of the touch pattern, the touch device sends the coordinate information and the touch width information to the application program, correspondingly, the application program receives the coordinate information and the touch width information and obtains first coordinate information and touch width information corresponding thereto; the touch device further sends the coordinate information of the touch pattern to the operating system, and the operating system then sends the received coordinate information (second coordinate information) to the application program, so that the application program can directly process the coordinate information forwarded by the operating system supported by the application programming framework.

In this way, the application can more easily respond to application level action when receiving the coordinate information forwarded by the operating system, compared to direct processing of the related data sent by the touch device to the application program. The operating system only forwards the coordinate information of the touch pattern without forwarding the corresponding touch width information, so that the amount of data forwarded by the operating system can be as small as possible to improve the corresponding forwarding effectiveness. After receiving the second coordinate system forwarded by the operating system, the application program can both simply make an application level response, and obtain complete touch information according to the second coordinate information (including the first coordinate information and the touch width information corresponding to the second coordinate information) through processing such as searching and detecting in the storage space.

S40: identifying the touch pattern according to the touch width information.

The application program can determine the size of the touch pattern according to the touch width information of the touch pattern, thereby identifying the source of the touch pattern, for instance, the touch pattern is input by the user through finger or through palm or other means; the touch pattern 202 as shown in FIG. 2 may be a touch pattern input by a user sliding a finger; the touch pattern 203 may be a touch pattern input by a user through a palm or through other means.

As an embodiment, for some application program, only a small-sized touch patterns is deemed as a valid touch instruction. For such cases, when the application program detects touch width information of a large value, the corresponding touch pattern may be identified as an invalid touch pattern. For example, if the touch width information includes the length a and the width b of the circumscribed rectangle, if any one of the length a and the width b is larger than the set value of the application program, the corresponding touch pattern may be identified as invalid; if the touch width information includes the long axis length w and the short axis length h of the inscribed ellipse, if any one of the long axis length w and the short axis length h is greater than another set value of the application program, the corresponding touch pattern may be identified as invalid.

In the method for identifying the touch pattern provided in the present disclosure, the application software that needs to acquire the touch information of touch pattern can directly obtain, from the touch device, the first coordinate information and the corresponding touch width information corresponding through related software, and can also obtain the second coordinate information of the current touch pattern through the corresponding operating system and then further search for corresponding first coordinate information, thereby detecting touch pattern width information, and then identifying the corresponding touch pattern according to the detected width information. This allows the application program more easily to respond application level action, simplifies the detection process of the corresponding touch width information, and ensures the effectiveness of acquisition of the touch information corresponding to the touch pattern, thereby improving the recognition effectiveness of the touch pattern.

Figure 6:
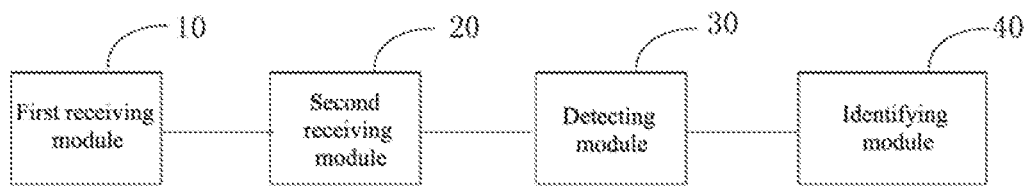
FIG. 6 is a schematic structural diagram of a system for identifying a touch pattern according to an embodiment.

Reference may be made to FIG. 6 which is a schematic structural diagram of a system for identifying a touch pattern according to an embodiment, including:

- a first receiving module 10 to receive, from a touch device, first coordinate information and corresponding touch width information for the touch pattern, and store the first coordinate information and the touch width information;
- a second receiving module 20 to receive, from an operating system, second coordinate information for a current touch pattern, where the second coordinate information is touch pattern coordinate information sent by the touch device to the operating system;
- a detecting module 30 to search, from the stored first coordinate information, for one consistent with the second coordinate information, and determine the touch width information corresponding to the first coordinate information that has been found as width information of the current touch pattern; and
- an identifying module 40 to identify the touch pattern according to the touch width information.

The system for identifying the touch pattern provided in the present disclosure has a one-to-one correspondence with the method for identifying the touch pattern provided in the present disclosure, as described hereby, the technical features and the beneficial effects described in the embodiment of the method for identifying the touch pattern are applicable to the embodiment of the system for identifying the touch pattern.

The technical features of the above-described embodiments may be combined in any manner. For the sake of concise description, possible combinations of the technical features in the above embodiments are not all described. However, as long as there is no contradiction between the combinations of these technical features, they should be considered as the disclosure of the scope of this description.

The above-described embodiments are merely illustrative of several embodiments of the present disclosure, and the description thereof is more specific and detailed, but should not be construed as limiting the scope of the disclosure. It should be noted that a number of variations and modifications may be made by those skilled in the art without departing from the spirit and scope of the disclosure. Therefore, the scope of the disclosure should be subject to the appended claims.

What is claimed is:

1. A method for detecting a touch pattern width, comprising:
   receiving, via a first communication link to an application from a touch device, a first coordinate information associated with a first touch pattern and a corresponding first touch width information associated with the first touch pattern, the first coordinate information comprising a first center coordinate value associated with the first touch pattern, wherein the first coordinate information is associated with a first identifier comprising an acquisition time and an acquisition position of the first coordinate information, and storing the first coordinate information and the first touch width information in a data dictionary;
   receiving, via a second communication link to the application from an operating system, a second coordinate information associated with a current second touch pattern, wherein the second coordinate information contains no corresponding touch width associated with the current second touch pattern, the second coordinate information comprising a second center coordinate value associated with the second touch pattern, wherein the second coordinate information is associated with a second identifier comprising an acquisition time and an acquisition position of the second coordinate information, wherein the second coordinate information is sent by the touch device to the operating system; and
   responsive to determining that the first identifier matches the second identifier,
      determining that the second center coordinate value is within a range of the first center coordinate value, and determining the first touch width information corresponding to the first center coordinate value in the dictionary, and assigning the first touch width information as width information to the second coordination information associated with the current second touch pattern.

2. The method for detecting the touch pattern width according to claim 1, wherein receiving, via the first communication link to an application from the touch device, the first coordinate information associated with a first touch pattern and the corresponding first touch width information associated with the first touch pattern further comprises:
   acquiring, via the first communication link to the application from the touch device, the first identifier comprising the acquisition time and the acquisition location of the first coordinate information, the first center coordinate value associated with the first touch pattern and the corresponding first touch width information.

3. The method for detecting the touch pattern width according to claim 1, wherein storing the first coordinate information and the first touch width information in the data dictionary further comprises:
   establishing a touch information set according to the first center coordinate value and the corresponding first touch width information;
   establishing a touch information table; and
   storing the touch information set into the touch information table.

4. The method for detecting the touch pattern width according to claim 3, wherein determining that the second center coordinate value is within a range of the first center coordinate value and determining the first touch width information corresponding to the first center coordinate value in the dictionary, and associating the first touch width information as width information to the current second touch pattern comprise:
   responsive to determining that the first identifier matches the second identifier,
      comparing the second center coordinate value with each piece of first coordinate information in the touch information table, and acquiring the first center coordinate value consistent with the second center coordinate value;
      reading the first touch width information in the touch information set corresponding to the first center coordinate value; and
      associating the first touch width information as the width information to the current second touch pattern.

5. The method for detecting the touch pattern width according to claim 1, wherein storing the first coordinate information and the first touch width information in a data dictionary comprises:
   establishing the data dictionary, and storing the first center coordinate value and the first touch width information into the data dictionary; and
   wherein determining that the second center coordinate value is within a range of the first center coordinate value comprises:
   responsive to determining that the first identifier matches the second identifier, searching, from the data dictionary, for the first center coordinate value having a distance from the second center coordinate value smaller than a pre-determined threshold and obtaining the first center coordinate value as consistent with the second center coordinate value.

6. The method for detecting the touch pattern width according to claim 1, further comprising:
   deleting the first touch width information that has been found and the corresponding first center coordinate value, and releasing storage space occupied by the first touch width information and the first center coordinate value.

7. The method for detecting the touch pattern width according to claim 1, prior to receiving the first center coordinate value associated with the first touch pattern and the corresponding first touch width information for the first touch pattern, further comprising:

using a serial port to set the first communication link with the touch device and the second communication link with the operating system respectively, wherein the first communication link is to receive the first center coordinate value and the first touch width information corresponding thereto sent by the touch device, and the second communication link is to receive, without the width information, the second center coordinate value sent by the operating system.

8. The method for detecting the touch pattern width according to claim 1, wherein the first touch width information comprises long axis information and short axis information of an inscribed ellipse corresponding to the first touch pattern.

9. The method for detecting the touch pattern width according to claim 1, wherein the operating system is to set a relay service program to transmit and receive the first coordinate information including the first touch width information, and wherein the relay program decouples direct communication between the application and the touch device.

10. A method for identifying a touch pattern, comprising:
receiving, via a first communication link to an application from a touch device, a first coordinate information associated with a first touch pattern and a corresponding first touch width information the first touch pattern, the first coordinate information comprising a first center coordinate value associated with the first touch pattern, wherein the first coordinate information is associated with a first identifier comprising an acquisition time and an acquisition position of the first coordinate information, and storing the first coordinate information and the first touch width information in a data dictionary;
receiving, via a second communication link to the application from an operating system, a second coordinate information associated with a current second touch pattern, wherein the second coordinate information contains no corresponding touch width associated with the current second touch pattern, the second coordinate information comprising a second center coordinate value associated with the second touch pattern, wherein the second coordinate information is associated with a second identifier comprising an acquisition time and an acquisition position of the second coordinate information, wherein the second coordinate information is sent by the touch device to the operating system; and
responsive to determining that the first identifier matches the second identifier,
determining that the second center coordinate value is within a range of the first center coordinate value, and determining the first touch width information corresponding to the first center coordinate value in the dictionary, and assigning the first touch width information as width information to the second coordination information associated with the current second touch pattern; and
identifying the second touch pattern according to the second touch width information.

11. The method for identifying a touch pattern according to claim 10, wherein the operating system is to set a relay service program to transmit and receive the first coordinate information including the first touch width information, and wherein the relay program decouples direct communication between the application and the touch device.

12. A system for detecting a touch pattern width, comprising:
a touch device; and
a processor, communicatively coupled to the touch device, to
receive, via a first communication link to an application from the touch device, a first coordinate information associated with a first touch pattern and a corresponding first touch width information associated with the first touch pattern, the first coordinate information comprising a first center coordinate value associated with the first touch pattern, wherein the first coordinate information is associated with a first identifier comprising an acquisition time and an acquisition position of the first coordinate information, and store the first coordinate information and the first touch width information in a data dictionary;
receive, via a second communication link to the application from an operating system, a second coordinate information associated with a current second touch pattern, wherein the second coordinate information contains no corresponding touch width associated with the current second touch pattern, the second coordinate information comprising a second center coordinate value associated with the second touch pattern, wherein the second coordinate information is associated with a second identifier comprising an acquisition time and an acquisition position of the second coordinate information, wherein the second coordinate information is sent by the touch device to the operating system; and
responsive to determining that the first identifier matches the second identifier,
determine that the second center coordinate value is within a range of the first center coordinate value, and determine the first touch width information corresponding to the first center coordinate value in the dictionary, and assign the first touch width information as width information to the second coordination information associated with the current second touch pattern.

13. The system for detecting a touch pattern width according to claim 12, wherein the operating system is to set a relay service program to transmit and receive the first coordinate information including the first touch width information, and wherein the relay program decouples direct communication between the application and the touch device.

14. A system for identifying a touch pattern, comprising:
a touch device; and
a processor, communicatively coupled to the touch device, to
receive, via a first communication link to an application from the touch device, a first coordinate information associated with a first touch pattern and a corresponding first touch width information associated with the first touch pattern, the first coordinate information comprising a first center coordinate value associated with the first touch pattern, wherein the first coordinate information is associated with a first identifier comprising an acquisition time and an acquisition position of the first coordinate information, and store the first coordinate information and the first touch width information in a data dictionary;
receive, via a second communication link to the application from an operating system, a second coordinate information associated with a current second touch pattern, wherein the second coordinate information contains no corresponding touch width associated with the current second touch pattern; the second coordinate information comprising a second center coordinate value associated with the second touch pattern, wherein the second coordinate information is associated with a second identifier comprising an acquisition time and an acquisition position of the second coordinate information, wherein the second coordinate information is sent by the touch device to the operating system; and responsive to determining that the first identifier matches the second identifier, determine that the second center coordinate value is within a range of the first center coordinate value, and determine the first touch width information corresponding to the first center coordinate value in the dictionary, and assign the first touch width information as width information to the second coordination information associated with the current second touch pattern; and identify the second touch pattern according to the second touch width information.

15. The system for identifying a touch pattern according to claim 14, wherein the operating system is to set a relay service program to transmit and receive the first coordinate information including the first touch width information, and wherein the relay program decouples direct communication between the application and the touch device.

* * * * *